US012351675B2

(12) United States Patent
Foix Tajuelo et al.

(10) Patent No.: US 12,351,675 B2
(45) Date of Patent: Jul. 8, 2025

(54) SOFT, WASHABLE POLYURETHANE FOAM WITH SLOW RECOVERY TIME

(71) Applicant: Dow Global Technologies LLC, Midland, MI (US)

(72) Inventors: David Foix Tajuelo, Horgen (CH); Anja Arlt, Horgen (CH); Lucie Porcelli, Richterswil (CH); Paul A. Cookson, Schindellegi (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 483 days.

(21) Appl. No.: 17/787,781

(22) PCT Filed: Jan. 4, 2021

(86) PCT No.: PCT/US2021/012033
§ 371 (c)(1),
(2) Date: Jun. 21, 2022

(87) PCT Pub. No.: WO2021/141841
PCT Pub. Date: Jul. 15, 2021

(65) Prior Publication Data
US 2023/0080960 A1 Mar. 16, 2023

Related U.S. Application Data

(60) Provisional application No. 62/957,349, filed on Jan. 6, 2020.

(51) Int. Cl.
| | | |
|---|---|---|
| *C08G 18/08* | (2006.01) | |
| *C08G 18/10* | (2006.01) | |
| *C08G 18/12* | (2006.01) | |
| *C08G 18/28* | (2006.01) | |
| *C08G 18/30* | (2006.01) | |
| *C08G 18/48* | (2006.01) | |
| *C08G 18/76* | (2006.01) | |
| *C08G 101/00* | (2006.01) | |

(52) U.S. Cl.
CPC ............ *C08G 18/14* (2013.01); *C08G 18/12* (2013.01); *C08G 18/302* (2013.01); *C08G 18/4808* (2013.01); *C08G 18/4816* (2013.01); *C08G 18/4837* (2013.01); *C08G 2101/00* (2013.01); *C08G 2110/0008* (2021.01); *C08G 2110/0083* (2021.01); *C08G 2280/00* (2013.01)

(58) Field of Classification Search
CPC .................................................. C08G 2280/00
See application file for complete search history.

(56) References Cited

U.S. PATENT DOCUMENTS

| | | | |
|---|---|---|---|
| 8,541,479 B2 | 9/2013 | Sasaki | |
| 2004/0087675 A1* | 5/2004 | Yu | .......... C08G 18/283 |
| | | | 521/170 |
| 2013/0150476 A1 | 6/2013 | Martin | |
| 2016/0135624 A1 | 5/2016 | Heidtmann | |
| 2018/0201717 A1* | 7/2018 | Corinti | .............. C08G 18/4837 |
| 2018/0265624 A1* | 9/2018 | Barksby | ............. C08G 18/1833 |
| 2019/0153148 A1* | 5/2019 | Barksby | ............. C08G 18/4812 |
| 2021/0301069 A1* | 9/2021 | Meng | ................. C08G 18/4238 |

FOREIGN PATENT DOCUMENTS

| | | |
|---|---|---|
| EP | 3023384 B | 5/2017 |
| WO | 2013/043645 A | 3/2013 |

* cited by examiner

*Primary Examiner* — Melissa A Rioja
(74) *Attorney, Agent, or Firm* — Warner Norcross + Judd LLP

(57) ABSTRACT

Very soft, launderable polyurethane foams for pillow and other bedding applications are made using a quasi-prepolymer of diphenylmethane diisocyanate and a polyether polyol having a high oxyethylene content. The quasi-prepolymer is reacted with isocyanate-reactive components that include a certain monoalcohol but is devoid of or nearly devoid of a polyether polyol having a high oxyethylene content.

11 Claims, No Drawings

SOFT, WASHABLE POLYURETHANE FOAM WITH SLOW RECOVERY TIME

This invention relates to slow-recovering polyurethane foam such as is useful for bedding and other cushioning applications.

Slow-recovering polyurethane foams have garnered important shares of the market for bedding materials in recent years. These foams, which are often referred to as "viscoelastic" or "memory" foams, are generally characterized by their low resiliency and by being slow to recover their original dimensions after being compressed. Those attributes contribute to a perception of comfort by human users.

Pillow foams have certain special requirements that present manufacturing challenges. In particular, pillow foams should be very soft in addition to exhibiting slow recovery. Unlike many other foam bedding products, pillows are frequently laundered. Very soft viscoelastic foams unfortunately tend to become harder after laundering. They also tend to become damaged, often tearing apart during the laundering process. A very soft viscoelastic foam that exhibits at most minimal changes in properties after laundering is wanted.

This invention is a polyurethane foam produced in a process comprising the steps of A) combining ingredients that comprise isocyanate-reactive components, a polyisocyanate component, at least one foam stabilizing surfactant and at least one urethane and/or urea catalyst at an isocyanate index of 65 to 95 to form a reaction mixture, and B) curing the reaction mixture to form the polyurethane foam, wherein the isocyanate-reactive components comprise;

a-1) 40 to 60 weight-%, based on the total weight of all isocyanate-reactive components, of one or more first polyether polyols having a hydroxyl number of 112 to 280 mg KOH/g, a nominal hydroxyl functionality of 2 to 4 and an oxyethylene content of 45 to 70% by weight;

a-2) 0 to 25 weight-%, based on the weight of all isocyanate-reactive components, of one or more second polyether polyols having a hydroxyl number of 20 to 70 mg KOH/g, a nominal hydroxyl functionality of 2 to 4 and an oxyethylene content of 0 to 25% by weight;

a-3) 5 to 25 weight-%, based on the weight of all isocyanate-reactive components, of one or more third polyether polyols having a hydroxyl number of 112 to 280 mg KOH/g, a nominal hydroxyl functionality of 2 to 4 and an oxyethylene content of 0 to 25% by weight; and a-4) 3 to 12 weight-%, based on the weight of all isocyanate-reactive components, of one or more polyether monols having a hydroxyl number of 50 to 200 mg KOH/g, and an oxyethylene content of at least 40% by weight; and a-5) 2 to 6 weight-%, based on the weight of all isocyanate-reactive components, of water;

and further wherein i) a-1), a-2), a-3), a-4) and a-5) together constitute at least 95% of the weight of the isocyanate-reactive components and ii) the isocyanate-reactive components include 0 to 2 weight-%, based on the weight of all isocyanate-reactive components, of one or more fourth polyether polyols having a hydroxyl number of at most 56 mg KOH/g, a nominal hydroxyl functionality of 2 or greater and an oxyethylene content of at least 70%;

and further wherein the polyisocyanate component is a quasi-prepolymer of diphenylmethane diisocyanate and a polyether polyol having a hydroxyl number of 15 to 56 mg KOH/g, a nominal hydroxyl functionality of 2 to 4 and an oxyethylene content of at least 70% by weight, the quasi-prepolymer having an isocyanate content of 25 to 31% by weight.

The polyurethane foam of the invention is characterized in having a foam density and hardness suitable for use as pillows and slow-recovery times. The foam also exhibits little or no change in these properties after laundering.

The isocyanate-reactive components of the reaction mixture include all ingredients that have isocyanate-reactive groups. The isocyanate reactive component includes at least ingredients a-1), a-3), a-4) and a-5).

Ingredient a-1) is one or more first polyether polyols having a hydroxyl number of 112 to 280 mg KOH/g, a nominal hydroxyl functionality of 2 to 4 and an oxyethylene content of 45 to 70% by weight. In some embodiments, its hydroxyl number is 125 to 200 mg KOH/g, its nominal hydroxyl functionality is 2.5 to 3.5 and its oxyethylene content is 50 to 65% by weight. In some embodiments, at least 50% of the hydroxyl groups of ingredient a-1) are primary hydroxyl groups, the remainder being secondary hydroxyl groups.

The weight of ingredient a-1) that is not oxyethylene units is preferably oxypropylene units and the weight of the residue of a starter compound. In some embodiments, ingredient a-1) is a random and/or block copolymer of ethylene oxide and propylene oxide.

Ingredient a-1) constitutes 40 to 60% of the total weight of all isocyanate-reactive components.

Ingredient a-2) is one or more second polyether polyols having a hydroxyl number of 20 to 70 mg KOH/g, a nominal hydroxyl functionality of 2 to 4 and an oxyethylene content of 0 to 25% by weight. In some embodiments, its hydroxyl number is 30 to 60 mg KOH/g, its nominal hydroxyl functionality is 2.5 to 3.5 and its oxyethylene content is 0 to 20% by weight, 5 to 20% by weight or 8 to 15% by weight. In some embodiments, at most 25% or at most 15% of the hydroxyl groups of ingredient a-2) are primary hydroxyl groups, the remainder being secondary hydroxyl groups.

The weight of ingredient a-2) that is not oxyethylene units is preferably oxypropylene units and the weight of the residue of a starter compound. In some embodiments, ingredient a-2) is a homopolymer of propylene oxide or a random and/or block copolymer of ethylene oxide and propylene oxide.

Ingredient a-2) constitutes 0 to 25% of the total weight of all isocyanate-reactive components. In some embodiments ingredient a-2) constitutes at least 5%, at least 10% or at least 12.5% of the weight of all isocyanate-reactive components and up to 20% or up to 18% thereof.

Ingredient a-3) is one or more third polyether polyols having a hydroxyl number of 112 to 280 mg KOH/g, a nominal hydroxyl functionality of 2 to 4 and an oxyethylene content of 0 to 25% by weight. In some embodiments, its hydroxyl number is at least 150 or at least 200 mg KOH/g, its nominal hydroxyl functionality is 2.5 to 3.5, and its oxyethylene content is 0 to 20% by weight, 0 to 10% by weight or 0 to 5% by weight. In some embodiments, at most 25%, at most 15% or at most 10% of the hydroxyl groups of ingredient a-3) are primary hydroxyl groups, the remainder being secondary hydroxyl groups.

The weight of ingredient a-3) that is not oxyethylene units is preferably oxypropylene units and the weight of the residue of a starter compound. In some embodiments, ingredient a-3) is a homopolymer of propylene oxide or a random and/or block copolymer of ethylene oxide and propylene oxide.

Ingredient a-3) constitutes 5 to 25% of the total weight of all isocyanate-reactive components. In some embodiments ingredient a-3) constitutes at least 10% or at least 12.5% of the weight of all isocyanate-reactive components and up to 20% or up to 18% thereof.

Ingredient a-4) is one or more polyether monols having a hydroxyl number of 50 to 200 mg KOH/g, a number average molecular weight of up to 1000 and an oxyethylene content of at least 40% by weight. In some embodiments, its hydroxyl number is at least 60 or at least 75 and up to 150 or up to 125 mg KOH/g and its oxyethylene content is greater than 70% to 100%, or 80 to 100% by weight. In some embodiments, at least 75%, of the hydroxyl groups of ingredient a-4) are primary hydroxyl groups, the remainder being secondary hydroxyl groups.

The weight of ingredient a-4) that is not oxyethylene units is preferably oxypropylene units and the weight of the residue of a starter compound. In some embodiments, ingredient a-4) is a homopolymer of ethylene oxide or a random and/or block copolymer of ethylene oxide and propylene oxide.

Ingredient a-4) constitutes 3 to 12% of the total weight of all isocyanate-reactive components. In some embodiments ingredient a-4) constitutes at least 5% or at least 6% of the weight of all isocyanate-reactive components and up to 10% thereof.

Ingredient a-5) is water, which constitutes 2 to 6% of the total weight of all isocyanate-reactive components. Water may constitute at least 3% and up to 5%, up to 4.5%, up to 4% or up to 3.75% of the total weight of all isocyanate-reactive components.

Ingredients a-1), a-2), a-3), a-4) and a-5) together constitute at least 95% of the weight of all isocyanate-reactive components. In some embodiments they together constitute at least 96%, at least 97% or at least 98% thereof, and may constitute 100% of the weight thereof. The weights of monofunctional impurities, if any, in any of ingredients a-1), a-2) and a-3) count in each case toward the weight of the respective ingredient.

The isocyanate-reactive components include at most 2 weight-%, based on the weight of all isocyanate-reactive components, of one or more fourth polyether polyols having a hydroxyl number of at most 56 mg KOH/g, a nominal hydroxyl functionality of 2 or greater and an oxyethylene content of at least 70%. The fourth polyether polyol may be absent and, if present at all, in some embodiments constitutes at most 1 weight-% or at most 0.5 weight-% thereof.

Other isocyanate-functional ingredients that may be present include, for example, i) hydroxyl- and/or amine-functional crosslinkers and chain extenders such as glycerin, trimethylolpropane, trimethylolethane, triethanolamine, diethanolamine, monoethanolamine, ethylene glycol, diethylene glycol, propylene glycol, dipropylene glycol and cyclohexanedimethanol; ii) polyethers different from those described above; iii) polyester polyols; and iv) amine-terminated polyethers.

The polyisocyanate component is a quasi-prepolymer of diphenylmethane diisocyanate and a polyether polyol having a hydroxyl number of 15 to 56 mg KOH/g, a nominal hydroxyl functionality of 2 to 4 and an oxyethylene content of at least 70% by weight, the quasi-prepolymer having an isocyanate content of 25 to 31% by weight.

The diphenylmethane diisocyanate may be any of the 4,4'-, 2,4'- or 2,2'-isomers or any mixture of two or more thereof. A preferred diphenylmethane diisocyanate contains at least 50% by weight of the 4,4'-isomer.

The polyether polyol used in making the prepolymer in some embodiments has a nominal hydroxyl functionality of 2.5 to 3.5, a hydroxyl number of 25 to 45 mg KOH/g and an oxyethylene content of 75% to 100% by weight.

The quasi-prepolymer is prepared by combining some or all of the diphenylmethane diisocyanate with the polyether polyol such that at least two moles of isocyanate groups are provided per mole of hydroxyl groups. The resulting reaction mixture is then reacted to consume the hydroxyl groups. The reaction is continued until the hydroxyl groups are consumed as indicated by a constant isocyanate content. If less than all of the diphenylmethane diisocyanate is present during the reaction, the remainder can be added subsequently. The reaction of diphenylmethane diisocyanate and the polyether produces compounds that have urethane groups and terminal isocyanate groups. The quasi-prepolymer includes a mixture of such compounds and free (unreacted) diphenylmethane diisocyanate.

The foam-stabilizing surfactant helps stabilize gas bubbles formed during the foaming process until the polymer has cured. A wide variety of silicone surfactants are useful, including silicone oils and organosilicone-polyether copolymers, such as polydimethyl siloxane and polydimethylsiloxane-polyoxyalkylene block copolymers. Such silicone surfactants are commercially available under the trade names Tegostab™ (Evonik Corporation), Niax™ (Momentive Performance Materials) and Dabco™ (Evonik Corporation). The foam-stabilizing surfactant may constitute, for example 0.1 to 2 percent of the weight of the entire reaction mixture. Silicone surfactants, even if they contain isocyanate-reactive groups, are not counted toward the weight of the isocyanate-reactive materials.

The reaction is performed in the presence of one or more catalysts. The catalyst(s) catalyze either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains 4 to 18 carbon atoms. Mixtures of these tertiary amine catalysts are often used.

A reactive amine catalyst such as DMEA (dimethylethanolamine) or DMAPA (dimethylaminopropyl amine), or an amine-initiated polyol. A catalyst, when reactive toward isocyanate groups, is counted toward the weight of the isocyanate-reactive materials in the reaction mixture.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl having up to 18 carbon atoms and n is 0 to 4, and the like. Zinc and tin catalysts are generally used in conjunction with one or more tertiary amine catalysts, if used at all.

Catalysts are typically used in small amounts, for example, each catalyst being employed from about 0.0015 to about 5 or 0.1 to 0.5 parts by weight per 100 parts by weight of the polyol mixture.

The reaction mixture may contain various optional ingredients, examples of which include: one or more flame retardants, such as a phosphorus-containing flame retardant, a halogenated flame retardant and melamine; a physical blowing agent; one or more pigments and/or colorants; one or more biocides; one or more preservatives; one or more antioxidants; and the like.

The foam is made by combining the aforementioned ingredients to form a reaction mixture which is then foamed and cured. The order of mixing is generally not critical although it is preferred to combine the quasi-prepolymer with the other ingredients last, or at least simultaneously with the mixing of the other ingredients.

The proportions of starting materials are selected such that the isocyanate index is 65 to 95. Isocyanate index refers to 100 times the ratio of isocyanate groups to isocyanate-reactive groups provided to the reaction mixture. An advantage of this invention is that very soft foam can be produced without using an extremely low isocyanate index. A preferred isocyanate index is at least 72 or at least 75, and up to 90 or up to 85.

The process of this invention requires no special foaming conditions; therefore, foaming conditions and equipment described in the art for making flexible polyurethane foam are entirely suitable. In general, the isocyanate compounds will react spontaneously with water and the polyols even at room temperature (23° C.) and therefore in some embodiments curing is accomplished without heating to an elevated temperature (apart from a temperature rise associated with a reaction exotherm that takes place during the curing). If necessary, heat can be applied to the reaction mixture to speed the curing reaction. This can be done by heating some or all of the ingredients prior to combining them, by applying heat to the reaction mixture as it cures, or some combination of each. If heat is applied, a suitable elevated temperature is 40 to 80° C. Curing is continued until the reaction mixture has expanded and cured sufficiently to form a stable foam.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part. Enough of the reaction mixture is introduced into the mold such that the resulting foam achieves the wanted density as it expands and fills the mold.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures.

The resulting foam may have a foam density of, for example, at least 24 g/L, at least 32 g/L or at least 36 g/L, as measured according to ASTM D3574, Test A. The foam density may be up to 64 g/L, up to 56 g/L, up to 48 g/L, up to 46 g/L or up to 43 g/L. These density ranges tend to produce foams that have the softness wanted for pillow applications. An especially preferred density is 37 to 43 g/L.

Foam softness (or, conversely, hardness) is conveniently determined by a compression force deflection (CFD) method such as ISO3386-1. In these applications, a CFD value of 0.4 to 1.0 kPa, and more preferably 0.4 to 0.85 kPa, at 40% compression is preferred.

The foam preferably exhibits a recovery time of at least two seconds, or at least 3 seconds and up to 15 seconds, more preferably up to 10 seconds. Recovery time for purposes of this invention is measured by compressing a 2.0-inch (5.08 cm) thick foam piece (4.0×4.0×2.0 inches, 10.16×10.16×5.08 cm) to 24% of its original thickness at room temperature, holding the foam at that compression for one minute and releasing the compressive force. The time required after the compressive force is released for the foam to regain 90% of original foam thickness is the recovery time. Recovery time is conveniently measured using a viscoelastic foam-testing device such as a RESIMAT 150 device (with factory software) from Format Messtechnik GmbH.

An important advantage of the invention is that the foam exhibits little or no change of properties upon being laundered. In particular, the foam exhibits at most a small increase in CFD upon laundering, such as 0 to 8% or up to 0 to 6% of its CFD value at 40% compression before laundering. Weight loss is also minimal, typically being 5% or less of the weight before laundering. This is a very significant benefit when the foam is to be used as a pillow or other bedding, because it can be laundered without damage when soiled and then used again without little or no loss of its haptic properties.

Accordingly, the foam of the invention is useful as pillow foam and for other cushioning and comfort applications. The foam may be molded into the shape of the pillow or other device, or can be cut to shape. The foam may be covered with a fabric or other sheet material that can serve a decorative and/or tactile function.

The following examples are provided to illustrate the invention, but are not intended to limit the scope thereof. All parts and percentages are by weight unless otherwise indicated.

EXAMPLES 1-2 AND COMPARATIVE SAMPLES A-F

Polyurethane foam pillows are made from ingredients as indicated in Table 1 below. All ingredients except the polyisocyanate are combined using a high-speed laboratory mixer. The polyisocyanate is then added and the resulting reaction mixture is poured into a mold (30 cm×30 cm×10 cm) which is then closed. The reaction mixture rises and is cured in the mold without applied heat for approximately 12 hours or for 5 minutes in a heated mold (around 50° C.).

Polyol a-1) is a random copolymer of ethylene oxide and propylene oxide. It has a hydroxyl number of 167 mg KOH/g, a nominal hydroxyl functionality of 3 and an oxyethylene content of 60% by weight;

Polyol a-2) is a random copolymer of ethylene oxide and propylene oxide. It has a hydroxyl number of 47.5 mg KOH/g, a nominal hydroxyl functionality of 3 and an oxyethylene content of 11% by weight; Polyol a-3) is a homopolymer of propylene oxide having a hydroxyl number of 237 mg KOH/g, a nominal hydroxyl functionality of 3 and an oxyethylene content of 0% by weight.

Monol a-4) is a homopolymer of ethylene oxide. It has a hydroxyl number of 102 mg KOH/g and an oxyethylene content of 100%.

Polyol 4 is a random copolymer of ethylene oxide and propylene oxide. It has a hydroxyl number of 37 mg KOH/g, a nominal hydroxyl functionality of 3 and an oxyethylene content of 78%.

QP-1 is a quasi prepolymer made by reacting 100 parts of a mixture of 98% 4,4'-MDI and 2% 2,4'-MDI with about 9.5 parts of Polyol 4 until the hydroxyl groups have been consumed. QP-1 has an isocyanate content of 29.5%.

The PMDI is a polymeric MDI product having an isocyanate content of 32.4%. The MDI fraction of this product includes about 75% of the 4,4'-isomer and 25% of the 2,4'-isomer.

Polyol 5 is a homopolymer of propylene oxide. It has a hydroxyl number of about 56, a nominal hydroxyl functionality of 3 and an oxyethylene content of 0%.

Polyol 6 is a nominally trifunctional homopolymer of propylene oxide. It has a hydroxyl number of approximately 170.

Polyol 7 is a homopolymer of ethylene oxide. It has a hydroxyl number of approximately 187 and is nominally difunctional.

Monol B is a monofunctional homopolymer of ethylene oxide having a hydroxyl number of about 160.

Surfactants A and B are silicone foam-stabilizing surfactants.

Catalysts A and B are each a mixture of gelling and blowing catalysts.

TABLE 1

| Ingredient | Parts By Weight | | | | | | | |
|---|---|---|---|---|---|---|---|---|
| | Ex. 1 | Ex. 2 | A* | B* | C* | D* | E* | F* |
| Polyol a-1) | 57.05 | 57.05 | 57.05 | 57.05 | 51.05 | 51.05 | 0 | 28.0 |
| Polyol a-2) | 15 | 15 | 15 | 15 | 15 | 15 | 0 | 0 |
| Polyol a-3) | 15 | 15 | 15 | 15 | 15 | 15 | 0 | 0 |
| Monol a-4) | 8 | 8 | 8 | 8 | 8 | 8 | 0 | 0 |
| Polyol 4 | 0 | 0 | 6 | 0 | 6 | 6 | 40 | 31 |
| Polyol 5 | 0 | 0 | 0 | 0 | 0 | 0 | 15 | 15.3 |
| Monol B | 0 | 0 | 0 | 0 | 0 | 0 | 4 | 0 |
| Polyol 6 | 0 | 0 | 0 | 0 | 0 | 0 | 34.3 | 0 |
| Polyol 7 | 0 | 0 | 0 | 0 | 0 | 0 | 0 | 20 |
| Glycerin | 0 | 0 | 0 | 0 | 0 | 0 | 1 | 0 |
| Catalyst A | 0.65 | 0.65 | 0.65 | 0.65 | 0.65 | 0.65 | 0 | 0 |
| Catalyst B | 0 | 0 | 0 | 0 | 0 | 0 | 1.20 | 1.20 |
| Surfactant A | 1 | 1 | 1 | 1 | 1 | 1 | 0 | 0 |
| Surfactant B | 0 | 0 | 0 | 0 | 0 | 0 | 1 | 1.5 |
| Water | 3.3 | 3.3 | 3.3 | 3.3 | 3.3 | 3.3 | 1.5 | 3 |
| QP-1 (index) | 68.1 (75) | 72.6 (80) | 0 | 0 | 62.2 (70) | 0 | 0 | 0 |
| PMDI (index) | 0 | 0 | 56.3 (70) | 61.9 (75) | 0 | 64.7 | 46.9 (100) | 55.6 (80) |

*Not an example of the invention.

Foam density in each case is measured according to ASTM D3574, Test A. Recovery time is determined according to the method described before. CFD at 40% compression measurements are made according to ISO3386-1 or equivalent method, both prior to and after laundering the pillows. Laundering is performed in a machine using a 40° C. water temperature and a 1600 rpm spin cycle, followed by drying for 2 hours at 55-60° C. in a tumble drier. Results of this testing are as indicated in Table 2.

TABLE 2

| Property | Result | | | | | | | |
|---|---|---|---|---|---|---|---|---|
| | Ex. 1 | Ex. 2 | A* | B* | C* | D* | E* | F* |
| Density, g/L | 39.4 | 39.9 | 37.5 | 37.6 | 38.6 | 38.9 | 74.6 | 44.2 |
| Recovery time, s | 4.9 | 5.9 | 8.0 | 3.6 | 18 | 40 | 0.6 | 1.1 |
| 40% CFD, kPa (before laundering) | 0.50 | 0.81 | 0.77 | 0.88 | 0.30 | 1.27 | 2.61 | 0.75 |
| 40% CFD, kPa (after laundering) | 0.53 | 0.83 | 1.00 | 1.00 | 0.34 | 1.35 | 2.69 | 0.82 |
| CFD increase upon laundering, kPa | 0.03 | 0.02 | 0.23 | 0.12 | 0.04 | 0.08 | 0.08 | 0.07 |
| CFD increase upon laundering, % | 6 | 2.5 | 29.9 | 13.6 | 13.3 | 6.3 | 3.1 | 9.3 |
| Weight loss upon laundering, % | 5 | 2.9 | 7.2 | 1.5 | 8.5 | 3.4 | 1.0 | 6.6 |

*Not an example of this invention.

Comp. Sample B represents a baseline case in this set of examples. The formulation is the same as in Examples 1 and 2, except a polymeric MDI is used in place of the quasi-prepolymer of Examples 1 and 2. Comp. Example B has a desirable density and exhibits a slow recovery time. The foam hardness before washing is only slightly higher than is wanted for a pillow application, but increases quite substantially upon laundering. A combination of polyols and monol in accordance with this invention, when used in conjunction with a polymeric MDI at a 75 index, therefore exhibits marginal properties for pillow applications even before laundering. Afterward it has become too hard.

Comp. Sample A is another foam made using polymeric MDI, in this case at an isocyanate index of only 70. 6 parts of Polyol 4 are added to the formulation. With these modifications, a soft, low density foam is obtained. However, this foam performs quite badly upon washing, as a very significant increase in hardness is seen together with a weight loss of over 7%. The good softness before laundering is attributed to the lower isocyanate index and the presence of Polyol 4; unfortunately those factors are also believed to contribute to the much poorer performance after laundering.

The presence of Polyol 4 is also believed to contribute to the poor performance after washing of each of Comparative Foams C and D. The quasi-prepolymer is used at a 70 index to make Comparative Sample C. Very low hardness is obtained, but the weight loss and increase in hardness after laundering are both high. In Comparative Sample D the quasi-prepolymer is replaced with polymeric MDI at an 80 index; this produces a foam that exhibits smaller property changes on laundering. Unfortunately it also yields a much harder foam that is not suitable for pillow applications. The use of polymeric MDI requires a lower index to obtain the wanted foam softness, but as Comp. Samples A and B show, reducing the isocyanate index also leads to a greater loss of properties after laundering.

Examples 1 and 2 demonstrate the wanted foam density, low hardness and slow recovery time, even at an isocyanate index of 75 or 80. Additionally, those foams exhibit only small changes in hardness and weight after laundering.

Comparatives Sample E and F are made approximately in accordance with US2013/0159476. The foam made at 100 index (Comp. Sample E) is at least 3 times harder than is wanted for pillow applications. Comp. Sample F, made at 80 index, is soft enough but does not exhibit the wanted slow recovery and exhibits large property changes after being laundered.

What is claimed is:

1. A polyurethane foam produced in a process comprising the steps of A) combining ingredients that comprise isocyanate-reactive components, a polyisocyanate component, at least one foam stabilizing surfactant and at least one urethane and/or urea catalyst at an isocyanate index of 65 to 95 to form a reaction mixture, and B) curing the reaction mixture to form the polyurethane foam, wherein the isocyanate-reactive components comprise;
a-1) one or more first polyether polyols having a hydroxyl number of 112 to 280 mg KOH/g, a nominal hydroxyl functionality of 2 to 4 and an oxyethylene content of 45 to 70% by weight, in an amount of 40 to 60 weight-%, based on the total weight of all isocyanate-reactive components in the reaction mixture;
a-2) one or more second polyether polyols having a hydroxyl number of 20 to 70 mg KOH/g, a nominal hydroxyl functionality of 2 to 4 and an oxyethylene content of 0 to 25% by weight, in an amount of 0 to 25 weight-%, based on the total weight of all isocyanate-reactive components in the reaction mixture;
a-3) one or more third polyether polyols having a hydroxyl number of 112 to 280 mg KOH/g, a nominal hydroxyl functionality of 2 to 4 and an oxyethylene content of 0 to 25% by weight, in an amount of 5 to 25 weight-%, based on the total weight of all isocyanate-reactive components in the reaction mixture; and
a-4) one or more polyether monols having a hydroxyl number of 50 to 200 mg KOH/g, a number average molecular weight of up to 1000 and an oxyethylene content of at least 40% by weight, in an amount of 3 to 12 weight-%, based on the total weight of all isocyanate-reactive components in the reaction mixture; and
a-5) water, in an amount of 2 to 6 weight-%, based on the total weight of all isocyanate-reactive components in the reaction mixture;
and further wherein i) a-1), a-2), a-3), a-4) and a-5) together constitute at least 95% of the weight of the isocyanate-reactive components in the reaction mixture and ii) the isocyanate-reactive components include one or more fourth polyether polyols having a hydroxyl number of at most 56 mgKOH/g and a nominal hydroxyl functionality of 2 or greater, in an amount of 0 to 2 weight-%, based on the total weight of all isocyanate-reactive components in the reaction mixture;
and further wherein the polyisocyanate component is a quasi-prepolymer of diphenylmethane diisocyanate and a polyether polyol having a hydroxyl number of 15 to 56 mg KOH/g, a nominal hydroxyl functionality of 2 to 4 and an oxyethylene content of at least 70% by weight, the quasi-prepolymer having an isocyanate content of 25 to 31% by weight.

2. The polyurethane foam of claim 1 wherein a-2) comprises 5 to 25% of the total weight of all isocyanate-reactive components in the reaction mixture.

3. The polyurethane foam of claim 2 wherein a-2) has a hydroxyl number of 30 to 60, an average hydroxyl functionality of 2.5 to 3.5 and contains 8 to 15% by weight oxyethylene units.

4. The polyurethane foam of claim 2 wherein water comprises 2 to 4.5% of the total weight of all isocyanate-reactive components in the reaction mixture.

5. The polyurethane foam of claim 2 wherein a-3) has a hydroxyl number of 200 to 280 mg KOH/g, an average hydroxyl functionality of 2.5 to 3.5 and contains 0 to 20% by weight oxyethylene units.

6. The polyurethane foam of claim 2 wherein a-3) comprises 10 to 20% of the total weight of all isocyanate-reactive components in the reaction mixture.

7. The polyurethane foam of claim 2 wherein the polyisocyanate component is a quasi-prepolymer of diphenylmethane diisocyanate and a polyether polyol having a hydroxyl number of 25 to 45 mg KOH/g, a nominal hydroxyl functionality of 2.5 to 3.5 and an oxyethylene content of 75 to 100% by weight.

8. The polyurethane foam of claim 2 wherein the isocyanate index is 72 to 90.

9. The polyurethane foam of claim 2 which has a density of 37 to 43 g/L, a 40% compression force deflection value of 0.4 to 1.0 kPa and a recovery time of at least 2 seconds.

10. The polyurethane foam of claim 2 which is a molded pillow.

11. A process of making a polyurethane foam, comprising the steps of A) combining ingredients that comprise isocyanate-reactive components, a polyisocyanate component, at least one foam stabilizing surfactant and at least one urethane and/or urea catalyst at an isocyanate index of 65 to 95 to form a reaction mixture, and B) curing the reaction mixture to form the polyurethane foam, wherein the isocyanate-reactive components comprise;

a-1) one or more first polyether polyols having a hydroxyl number of 112 to 280 mg KOH/g, a nominal hydroxyl functionality of 2 to 4 and an oxyethylene content of 45 to 70% by weight, in an amount of 40 to 60 weight-%, based on the total weight of all isocyanate-reactive components in the reaction mixture;

a-2) one or more second polyether polyols having a hydroxyl number of 20 to 70 mg KOH/g, a nominal hydroxyl functionality of 2 to 4 and an oxyethylene content of 0 to 25% by weight, in an amount of 0 to 25 weight-%, based on the total weight of all isocyanate-reactive components in the reaction mixture;

a-3) one or more third polyether polyols having a hydroxyl number of 112 to 280 mg KOH/g, a nominal hydroxyl functionality of 2 to 4 and an oxyethylene content of 0 to 25% by weight, in an amount of 5 to 25 weight-%, based on the total weight of all isocyanate-reactive components in the reaction mixture; and a-4) one or more polyether monols having a hydroxyl number of 50 to 200 mg KOH/g, a number average molecular weight of up to 1000 and an oxyethylene content of at least 40% by weight, in an amount of 3 to 12 weight-%, based on the total weight of all isocyanate-reactive components in the reaction mixture; and a-5) water in an amount of 2 to 6 weight-%, based on the total weight of all isocyanate-reactive components in the reaction mixture;

and further wherein i) a-1), a-2), a-3), a-4) and a-5) together constitute at least 95% of the weight of the isocyanate-reactive components in the reaction mixture and ii) the isocyanate-reactive components include one or more fourth polyether polyols having a hydroxyl number of at most 56 mgKOH/g and a nominal hydroxyl functionality of 2 or greater, in an amount of 0 to 2 weight-%, based on the total weight of all isocyanate-reactive components in the reaction mixture;

and further wherein the polyisocyanate component is a quasi-prepolymer of diphenylmethane diisocyanate and a polyether polyol having a hydroxyl number of 15 to 56 mg KOH/g, a nominal hydroxyl functionality of 2 to 4 and an oxyethylene content of at least 70% by weight, the quasi-prepolymer having an isocyanate content of 25 to 31% by weight.

* * * * *